United States Patent [19]

Kurata et al.

[11] Patent Number: 5,133,805
[45] Date of Patent: Jul. 28, 1992

[54] PLATE-LIKE HEMATITE PARTICLES, A PIGMENT COMPRISING THE SAME AND SHOWING A GOLDEN COLOR, AND A PROCESS FOR PRODUCING THE SAME

[75] Inventors: Tokihiro Kurata; Tsutomu Katamoto; Nanao Hiriishi, all of Hiroshima; Masao Kiyama, Kyoto, all of Japan

[73] Assignee: Toda Kogyo Corp., Hiroshima, Japan

[21] Appl. No.: 611,280

[22] Filed: Nov. 9, 1990

Related U.S. Application Data

[63] Continuation-in-part of Ser. No. 466,132, Jan. 19, 1990, abandoned, which is a continuation-in-part of Ser. No. 234,048, Aug. 19, 1988, abandoned.

[30] Foreign Application Priority Data

| Aug. 28, 1987 | [JP] | Japan | 62-215563 |
| Nov. 28, 1987 | [JP] | Japan | 62-301335 |
| Feb. 13, 1989 | [JP] | Japan | 1-34676 |
| Feb. 14, 1989 | [JP] | Japan | 1-35307 |
| Mar. 3, 1989 | [JP] | Japan | 1-52569 |
| Mar. 3, 1989 | [JP] | Japan | 1-52570 |

[51] Int. Cl.$^5$ .............................................. C09C 1/22
[52] U.S. Cl. .............................................. 106/456; 106/459
[58] Field of Search .................. 106/456, 403, 415, 439, 106/418, 459

[56] References Cited

U.S. PATENT DOCUMENTS

| 4,289,746 | 9/1981 | Hayakawa | 106/456 |
| 4,676,838 | 6/1987 | Franz | 106/456 |
| 4,698,100 | 10/1987 | Burow | 106/456 |
| 4,840,677 | 6/1989 | Ostertag | 106/456 |
| 4,946,641 | 8/1990 | Skinner | 106/418 |
| 5,032,180 | 7/1991 | Krockert | 106/456 |

Primary Examiner—Peter D. Rosenberg
Attorney, Agent, or Firm—Nixon & Vanderhye

[57] ABSTRACT

Disclosed herein are plate-like hematite particles having an average particle diameter of 0.5 to 5.0 μm, a lamellar thickness of 50 to 500Å and a plate ratio (the ratio of the average particle diameter to the lamellar thickness) of 50:1 to 500:1, an iron oxide pigment showing a golden color and comprising the plate-like hematite particles, and a process for producing the plate-like hematite particles.

19 Claims, 4 Drawing Sheets

Fig. 1
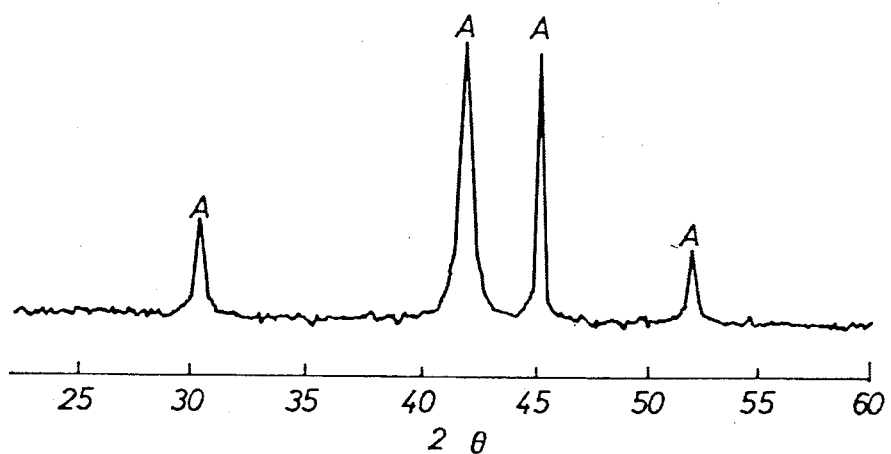
Fig. 2
Fig. 3 (x10000)

(×10000)

PLATE-LIKE HEMATITE PARTICLES, A PIGMENT COMPRISING THE SAME AND SHOWING A GOLDEN COLOR, AND A PROCESS FOR PRODUCING THE SAME

CROSS-REFERENCE TO RELATED APPLICATION

The present application is a continuation-in-part application of Ser. No. 07/466,132 filed on Jan. 19, 1990 which is a continuation-in-part application of Ser. No. 07/234,048 filed on August 19, 1988 both abandoned.

BACKGROUND OF THE INVENTION

The present invention relates to plate-like hematite particles, an iron oxide pigment comprising the same and showing a golden color, and a process for producing the same. Such an iron oxide pigment is chiefly used as a coloring material for paints, rubber compositions, resin compositions, printing inks, cosmetics and the like showing a golden color.

Further, the present invention relates to a paint, a rubber composition or a resin composition containing the iron oxide pigment and showing a golden color with metallic luster. Such a paint, rubber composition and resin composition are mainly used as materials for electric appliances, daily necessaries such as tableware, building materials, containers and accessories such as buttons.

Also, the present invention relates to a method for drawing a three dimensional picture (stereograph). Such a method is applied to the fields of the manufacture of the electric appliances, the daily necessaries, the building materials, the containers and the accessories.

Hematite (colcothar) particles which are typical of iron oxide pigments, show a red color, so that they are widely used as a red color pigment for producing paints, printing inks and cosmetics. Plate-like hematite particles show a black purple color and are used as a black purple pigment. Since the plate-like hematite particles are oriented in a superposed state, they are excellent in the coating property, so that they are also used as an anti-corrosive pigment.

Generally, since iron oxide pigments are oxides, they have a high resistance to the acid in the vehicle during producing a paint or the like, and an excellent resistance to environment pollution or the like.

However, goods have recently been required to have not only functional qualities but also sensuous quality characteristics. In particular, as to colors, a golden color with a metallic luster which make a high quality impression has been strongly demanded.

A golden color with a metallic luster is conventionally economically obtained by blending a brass powder, a powder alloy of brass and zinc, or a mixed powder of a brass powder and a zinc powder into a vehicle.

However, if it is produced by the conventional method, since the pigment is a metal powder, the resistance to the acid in the vehicle is low and the resistance to environment pollution or the like is also low, so that the stability thereof is insufficient.

On the other hand, although an iron oxide pigment is excellent in the stability, as described above, it is a red coloring pigment and no iron oxide pigment showing a golden color has yet been produced.

For example, processes for producing an iron oxide pigment showing a red color have been proposed in Japanese Patent Application Laid Open (KOKAI) No. 61-174120 (1986) which corresponds to U.S. Pat. No. 4,676,838 and Japanese Patent Application Laid Open (KOKAI) No. 55-104923 (1980) which corresponds to U.S. Pat. No. 4,404,254.

U.S. Pat. No. 4,676,838 discloses lamellar pigments consisting of α-iron oxide with an $Fe_2O_3$ content of at least 88%, an average particle diameter of from 0.5 to 20 μm, an average ratio of diameter to thickness of from 20 to 100, and an almost normally distributed particle size distribution, the relative standard deviation of which, based on the average value of the normal distribution, is less than 0.3, and showing a copper-colored to red color; and a process of production of an α-iron oxide pigments by the hydrothermal treatment of a trivalent iron-containing solution or suspension, comprising adding to the solution or suspension prior to the hydrothermal treatment active α-iron oxide seeds with lamellar or disc-like crystal form and a specific surface of at least 10 $m^2/g$.

U.S. Pat. No. 4,404,254 discloses hexagonal, lamellar iron oxide particles substantially homogeneously about 0.1 to 12% by weight of at least one oxide of an element of the IVth, Vth or VIth Main and Secondary Groups and of the IInd Secondary Group of the Periodic System of elements, and showing a bluish red to yellowish red color; and a process for production of hexagonal, lamellar iron oxide particles which is characterized in that compounds of at least one of the elements of the IVth, Vth and/or VIth Main and/or Secondary Group and/or of the IInd Secondary Group of the Periodic System of the elements are present during the growth of the iron oxide particles or of identically shaped precursor crystal particles in the hydrothermal production.

Accordingly, the establishment of the process for producing an iron oxide pigment which shows a golden color has been strongly demanded.

On the other hand, paints are generally obtained by mixing coloring pigments as a coloring material, which show a color and luster, into paint base materials such as resin, solvents, body color pigments and if necessary, drying accelerators, surfactants, auxiliary agents and the like, from the viewpoints of vision and beauty.

Also, rubber or resin compositions are obtained by mixing coloring pigments as a coloring material, which show a color and luster, into rubber or resin composition base materials such as various kinds of rubber or synthetic resins and if necessary, plasticizers, stabilizers such as antioxidants, ultraviolet absorbers and the like, from the viewpoints of vision and beauty.

In general, paints, rubber or resin compositions showing a golden color with metallic luster can be economically obtained by mixing a brass powder, a powder alloy of brass and zinc or a powder mixture of brass powder and zinc powder with paint base materials, rubber composition base materials or resin composition base materials. However, in these paints, rubber or resin compositions, the resistance to the acid in the paint base materials, the rubber composition base materials or the resin composition base materials used during the formation thereof is low and the resistance to environment pollution is also low. Therefore, it has been strongly demanded to provide paints, rubber or resin compositions having excellent resistance to the acid therein and to environmental pollution.

Recently improvements in culture and life have required in not only functional qualities but also quality characteristics of goods in view of sense and interest.

Appearances in which three-dimensional pictures are formed, are particularly important factors which increase a feel of high grade and depth to determine the value as commercial products.

Three-dimensional pictures can be formed by, for example, a method of forming uneven patterns on the surfaces of molded products, as disclosed in Japanese Patent Publication No. 62-16832 (1987), a method of spraying or printing paints or ink having desired compositions so that color differences and gloss differences can be produced, or a method of employing jointly such methods.

Although there is now a greater demand for the formation of three-dimensional pictures (images), in the above-described known method of forming uneven patterns on the surfaces of molded products, since three-dimensional pictures are formed by the depth of unevenness, three-dimensional pictures cannot be satisfactorily obtained because of the limit of the depth itself, and pictures of the complicated forms cannot be easily shown only by using unevenness.

Further, in the above-described known method of spraying or printing paints or ink, it is difficult to produce satisfactory color differences or gloss differences because it is necessary to use various types of paints or ink having various colors and various degrees of gloss, and to repeat selective coloring processes in accordance with the form patterns. In addition, although a three-dimensional pictures can be formed by stepwisely changing the degree of a depth of unevenness or the degrees of a color difference and a gloss difference, since this method requires a complicated steps, such method thus exhibits poor workability and poor productivity, and is an industrial and economical method.

As a result of the present inventors' studies for dissolving such problems, it has been found that by autoclaving an alkaline suspension of iron (III) oxide hydroxide particles, $FeO_x \cdot Fe_2O_3$ ($0 \leq X \leq 1$) particles or a ferric salt, a pH of the alkaline suspension being not less than 9, 0.1 to 15.0 mol of water-soluble salt based on 1 mol of Fe being added to the alkaline suspension and an Si-containing compound being added to the alkaline suspension so as to contain 1.5 to 20.0 mol. % of Si based on the total amount of Fe in the alkaline suspension, plate-like hematite particles having an average particle diameter of 0.5 to 5.0 μm, a lamellar thickness of 50Å to 500Å and a plate ratio (the ratio of the average particle diameter to the lamellar thickness) of 50:1 to 500:1 and showing a golden color have been obtained. The present invention has been achieved on the basis of this finding.

SUMMARY OF THE INVENTION

In a first aspect of the present invention, there is provided plate-like hematite particles having an average particle diameter of 0.5 to 5.0 μm, a lamellar thickness of 50Å to 500Å and a plate ratio (the ratio of the average) particle diameter to the lamellar thickness) of 50:1 to 500:1.

In a second aspect of the present invention, there is provided an iron oxide pigment showing a golden color and comprising plate-like hematite particles having an average particle diameter of 0.5 to 5.0 μm, a lamellar thickness of 50Å to 500Å and a plate ratio (the ratio of the average particle diameter to the lamellar thickness) of 50:1 to 500:1.

In a third aspect of the present invention, there is provided a process for producing plate-like hematite particles according to the first aspect, the said process comprising autoclaving an alkaline suspension of iron (III) hydroxide oxide particles, $FeO_x \cdot Fe_2O_3$ ($0 \leq X \leq 1$) particles or a ferric salt, the said alkaline suspension having a pH of not less than 9 and containing 0.1 to 15.0 mol of water-soluble salt based on 1 mol of Fe and a Si-containing compound of 1.5 to 20.0 mol. %, expressed as Si, based on the total amount of Fe in the alkaline suspension.

In a fourth aspect of the present invention, there is provided a paint showing a golden color and comprising paint base materials and plate-like hematite particles having an average particle diameter of 0.5 to 5.0 μm, a lamellar thickness of 50Å to 500Å and a plate ratio of 50:1 to 500:1.

In a fifth aspect of the present invention, there is provided rubber or resin compositions showing a golden color and comprising rubber or resin composition base materials and plate-like hematite particles having an average particle diameter of 0.5 to 5.0 μm, a lamellar thickness of 50Å to 500Å and a plate ratio of 50:1 to 500:1.

In a sixth aspect of the present invention, there is provided a method of drawing a three-dimensional picture, comprising coating on the surface of a shaped product with a paint comprising paint base materials and plate-like hematite particles having an average particle diameter of 0.5 to 5.0 μm, a lamellar thickness of 50Å to 500Å and a plate ratio of 50:1 to 500:1, applying a magnetic field to the coated paint in an undried state, so as to draw the picture formed by controlling the strength and direction of the magnetic flux on the surface of the shaped product.

In a seventh aspect of the present invention, there is provided a method of drawing a three-dimensional picture, comprising mixing plate-like hematite particles having an average particle diameter of 0.5 to 5.0 μm, a lamellar thickness of 50Å to 500Å and a plate ratio of 50:1 to 500:1 with rubber or resin composition base materials, kneading and molding the resultant mixture; after a magnetic field to the molded product in a fluid state, and then curing the molded product to form a rubber or resin shaped product, thereby drawing the picture formed by controlling the strength and direction of the magnetic flux on the rubber or resin shaped product.

BRIEF DESCRIPTION OF THE DRAWINGS

FIG. 1 is an X-ray diffraction pattern of plate-like hematite particles obtained in Example 1, wherein the peak A represents hematite.

FIGS. 2 and 3 are electron micrographs (FIG. 2: ×5,000 and FIG. 3: ×10,000) of plate-like hematite particles obtained in Example 1 and Example 8, respectively.

DETAILED DESCRIPTION OF THE INVENTION

Figure 4:
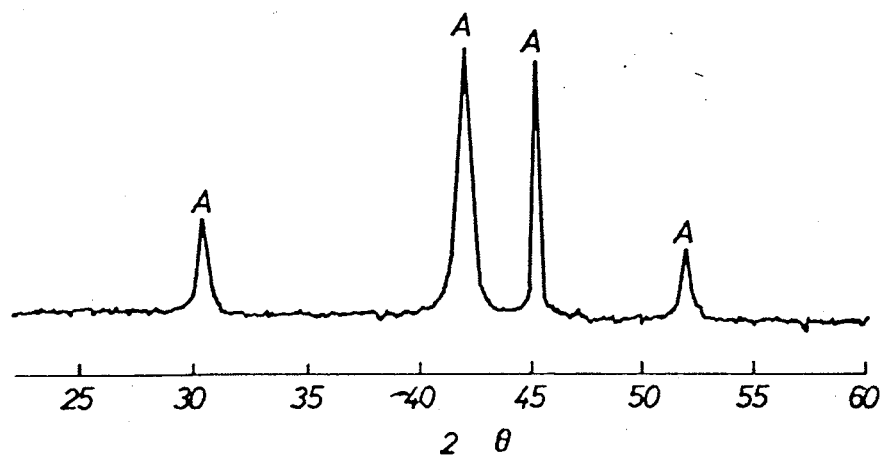
FIG. 4 and 5 are an X-ray diffraction pattern and an electron micrograph (×10,000), respectively, of the plate-like hematite particles obtained in Example 11, the peak A in FIG. 4 representing hematite.

Plate-like hematite particles according to the present invention have an average diameter of 0.5 to 5.0 μm, a thickness of 50Å to 500Å and a plate ratio of 50:1 to 500:1, and are obtained by autoclaving an alkaline suspension of iron (III) hydroxide oxide particles, $FeO_x\cdot Fe_2O_3$ ($0 \leq X \leq 1$) particles or a ferric salt, the alkaline suspension having a pH of not less than 9, and containing a 0.1 to 15.0 mol of water-soluble salt based on 1 mol of Fe and an Si-containing compound of 1.5 to 20.0 mol%, expressed as Si, based on the total amount of Fe in the alkaline suspension.

Plate-like hematite particles showing a golden color and having a lightness ($L^*$ value) of not less than 30, a hue ($\theta^* = \tan^{-1} b^*/a^*$) of not less than 50°, and chroma ($C^*ab = \sqrt{a^{*2}+b^{*2}}$) of not less than 17 (wherein $L^*$, $a^*$ and $b^*$ are values represented by the ($L^*$, $a^*$, $b^*$) uniform sensory color space of the CIE 1976), are preferred in the present invention.

Plate-like hematite particles having an average particle diameter of 1.0 to 4.0 μm, a lamellar thickness of 100Å to 400Å, a plate ratio of 100:1 to 300:1, a lightness ($L^*$ value) of 35 to 65, more preferably 40 to 50, a hue ($\theta^* = \tan^{-1} b^*/a^*$) of not less than 50°, and a chroma ($C^*ab = \sqrt{a^{*2}+b^{*2}}$) of not less than 120, are particularly preferred in the present invention.

The reason why the plate-like hematite particles of the present invention shows a golden color is not clear, but the present inventors consider that it has some relation with the particle form, thickness and plate ratio of the hematite particles and the surface state of the particles.

In general, plate-like hematite particles are conventionally obtained by autoclaving an alkaline suspension of ferric ion which has a pH of not less than 9, as described in "Journal of the Japan Society of Colour Material" Vol. 60, No. 5 (1987) pages 265 to 272, published by Shikizai Kyokai.

The plate-like hematite particles according to the present invention are produced by autoclaving an alkaline suspension of ferric ion containing a water-soluble salt and Si-containing compound, and having a pH of not less than 9.

Various conditions for obtaining plate-like hematite particles according to the present invention are set forth below.

The iron (III) oxide hydroxide particles may have any particle form such as an acicular form and a spindle form that is obtained by a conventional reaction method. It is possible to use a wet-cake obtained by washing a reaction mother liquor containing iron (III) oxide hydroxide with water, a dried wet-cake thereof or the reaction mother liquid.

As the $FeO_x\cdot Fe_2O_3$ ($0 \leq X \leq 1$) particles are usable, for example, a wet-cake obtained by washing with water a reaction mother liquor containing granular or cubic magnetite particles obtained by the reaction of ferrous salt and an aqueous alkaline solution, a dried wet-cake thereof or the reaction mother liquid, and acicular or spindle $FeO_x\cdot Fe_2O_3$ ($0 \leq X \leq 1$) particles obtained by reducing or further oxidizing, if necessary, the above-mentioned acicular of spindle iron (III) oxide hydroxide particles.

As the ferric salt, ferric chloride, ferric sulfide, ferric nitrate, etc. are usable.

The pH of the alkaline suspension in the present invention is not less than 9, preferably not less than 12. If the pH is less than 9, acicular iron (III) oxide hyroxide particles or $FeO_x\cdot Fe_2O_3$ ($0 \leq X \leq 1$) particles are disadvantageously mixed into the plate-like hematite particles.

The autoclaving method in the present invention is carried out by using an autoclave at a temperature of, ordinarily 150° to 330°, preferably 200° to 300° C., more preferably 250° to 300° C. for 2 to 6 hours. It is a general tendency that the higher the alkali concentration is, the lower is the reaction temperature for producing plate-like hematite particles. If the temperature is lower than 150° C., the suspension contains iron (III) oxide hydroxide, $FeO_x\cdot Fe_2O_3$ ($0 \leq X \leq 1$) or a ferric salt as it is, thereby producing no plate-like hematite particles. If the temperature is higher than 330° C., the production of plate-like hematite particles is possible, but when the safety of the autoclave is taken into consideration, the upper limit of the temperature is 330° C.

As a water-soluble salt used in the present invention, sulfates, nitrates, chlorides and acetates of alkaline metals may be exemplified.

The amount of water-soluble salt added is 0.1 to 15.0 mol, preferably 0.5 to 10.0 mol, more preferably 3.0 to 5.0 mol based on 1 mol of Fe. By the synergistic effect on the coexistence of the water-soluble salt and Si-containing compound, the plate-like hematite particles having very thin thickness, particularly, the thickness of 50Å to 500Å and relatively large plate ratio, particularly, the plate ratio of 50:1 to 500:1 can be obtained.

If the water-soluble salt added is less than 0.1 mol, the thickness and plate ratio of the plate-like hematite particles produced becomes unfavorable. In particular, since the thickness of the plate-like hematite particles becomes more than 500Å, the plate ratio of the plate-like hematite particles becomes less than 50:1 and the hue of the particles becomes low, it is difficult to obtain the target plate-like hematite particles of the present invention. Even if the water-soluble salt added is more than 15 mol, it is possible to obtain the target plate-like hematite particles of the present invention, but the addition of water-soluble salt more than necessary is useless.

As examples of the Si-containing compound used in the present invention, the silicates of potassium and sodium, and colloidal silica may be exemplified.

The Si-containing compound is added so that 1.5 to 20.0 mol. %, preferably 5.0 to 15.0 mol. %, expressed as Si, is contained in the alkaline suspension based on the total amount of Fe. If the amount of the Si-containing compound added is less than 1.5 mol. %, expressed as Si, based on the total amount of Fe, the thickness of the plate-like hematite particles becomes more than 500Å and, hence, the plate ratio becomes small, so that the plate-like hematite particles taken on from red-purple to black purple color. On the other hand, if it is more than 20 mol. %, expressed as Si, based on the total amount of Fe, the thickness of the plate-like hematite particles becomes smaller than 50Å on the basis of the synergistic effect of the water-soluble salt and Si-containing compound, and as a result it is apt to arise the phenomenon of destruction of the particle form.

The water-soluble salt and the Si-containing compound in the present invention exert an influence on the particle form (for example, the plate ratio and the thickness) and the surface property of the plate-like hematite particles produced. It is, therefore, necessary to add the water-soluble salt and the Si-containing compound before the reaction of producing the plate-like hematite particles.

The water-soluble salt may be added before, simultaneously with, or after the addition of the Si-containing compound.

The average particle diameter and plate ratio of the plate-like hematite particles is apt to be increased in proportion to the amount of water-soluble salt added.

As iron oxide pigment according to the present invention comprises plate-like hematite particles having an average particle diameter of 0.5 to 5.0 μm, a lamellar thickness of 50Å to 500Å and a pate ratio of 50:1 to 500:1, and having preferably a lightness (L* value) of not less than 30, a hue ($\theta^* = \tan^{-1} b^*/a^*$) of not less than 50° and a chroma ($C^*ab = \sqrt{a^{*2} + b^{*2}}$) of not less than 17, shows a golden color and is excellent in the stability. Thus, the iron oxide pigment of the present invention is suitable as a golden color pigment for paints, printing inks and cosmetics.

A paint, rubber or resin composition showing a golden color with metallic luster according to the present invention comprises a plate-like hematite particles and paint, rubber or resin composition base materials which are blended with the plate-like hematite particles.

The mixing ratio of the plate-like hematite particles according to the present invention is 0.1 to 200 parts by weight based on b 100 parts by weight of the paint base materials. If the hue and gloss are taken into account, the mixing ratio of the plate-like hematite particles is preferably 0.1 to 100 parts by weight, more preferably 0.1 to 50 parts by weight based on 100 parts by weight of the paint base materials.

The paint base materials used in the present invention are composed of a resin, a solvent a body color pigment and, if necessary, a drying accelerator, a surfactant, a curing accelerator, an auxiliary and the like.

As the resin that can be used as the paint base materials, acrylic resin, alkyd resin, polyester resin, polyurethane resin, epoxy resin, phenolic resin, amino resin and the like, which are generally used for paints, may be exemplified.

As the solvents that can be used as the paint base materials, toluene, xylene, butyl acetate methyl acetate, methyl isobutyl ketone, butyl alcohol, aliphatic hydrocarbons and the like, which are generally used for paints may be exemplified.

As a coated material, steel plate, high-molecular compound molded products, paper, glass, ceramics and the like to which a paint can be applied, may be exemplified.

The mixing ratio of the plate-like hematite particles according to the present invention is 0.1 to 90 parts by weight based on the 100 parts by weight of the rubber or resin composition based materials. If the hue and glass are taken into account, the mixing ratio of the plate-like hematite particles is preferably 0.1 to 50 parts by weight, more preferably 0.1 to 30 parts by weight based on 100 parts by weight of the rubber or resin composition base materials.

The rubber of resin composition base materials used in the present invention are composed of resin and, if necessary, a plasticizer and various stabilizers such as an antioxidant, an ultraviolet absorber and the like.

As the resin that may be used as the resin composition base materials, a thermoplastic resin such as polystyrene resin, polyethylene resin, AS resin, ABS resin, vinyl chloride resin, EVA resin, PMMA resin, polyamide resin and polypropylene resin; and a thermosetting resin such as phenolic resin, urea resin, melamine resin, alkyd resin epoxy resin and polyurethane resin may be exemplified.

As the rubber that may be used as the rubber composition base materials, nitrile rubber, isoprene rubber, styrene-butadiene rubber, silicone rubber and chloroprene rubber may be exemplified.

A method of drawing a three-dimensional picture according to the present invention, comprises
 (i) coating on the surface of the molded product with the paint composed of the paint base materials and the plate-like hematite particles, and applying a magnetic field to the coated paint in an undried state; and
 (ii) mixing the plate-like hematite particles and the rubber or resin composition base materials, kneading and molding the resultant mixture, applying a magnetic field to the molded product in a fluid state, and a curing the molded product.

The method of drawing a picture in the present invention is capable of forming an extremely good picture (image) in three dimensions owing to a great color difference between the portion to which the magnetic field is applied and the portion to which no magnetic field is applied.

In regard to the reason for the drawing of a three-dimensional picture in the present invention, the inventors consider that the orientation direction of the plate-like hematite particles is easily changed whereby the reflection direction of light is changed, when the particles act in response to the magnetic field due to the size and the form of the plate-like hematite particles used, the small magnetization value possessed by the plate-like hematite particles and the independent distribution thereof. That is, the plate-like hematite particles are oriented in parallel with the direction of the magnetic flux in response to the magnetic field and, consequently, the plate-like hematite particles are oriented in parallel with the direction of the magnetic flux in the external periphery of the picture drawn, the plate-like hematite particles are oriented in a direction vertical to the direction of the magnetic flux in the internal portion of the picture surrounded by the external periphery, and the plate-like hematite particles are oriented in parallel with the film surface in the portion where no picture is formed.

Since the method of drawing a picture in the present invention is capable of easily forming a three-dimensional picture (image) only by applying a magnetic field to the coated product in the undried state or to the molded product in the fluid state, the method exhibits good workability and productivity and is very useful as an industrial and economical method.

Some of the many experimental examples conducted by the inventor are described below.

Figure 6:
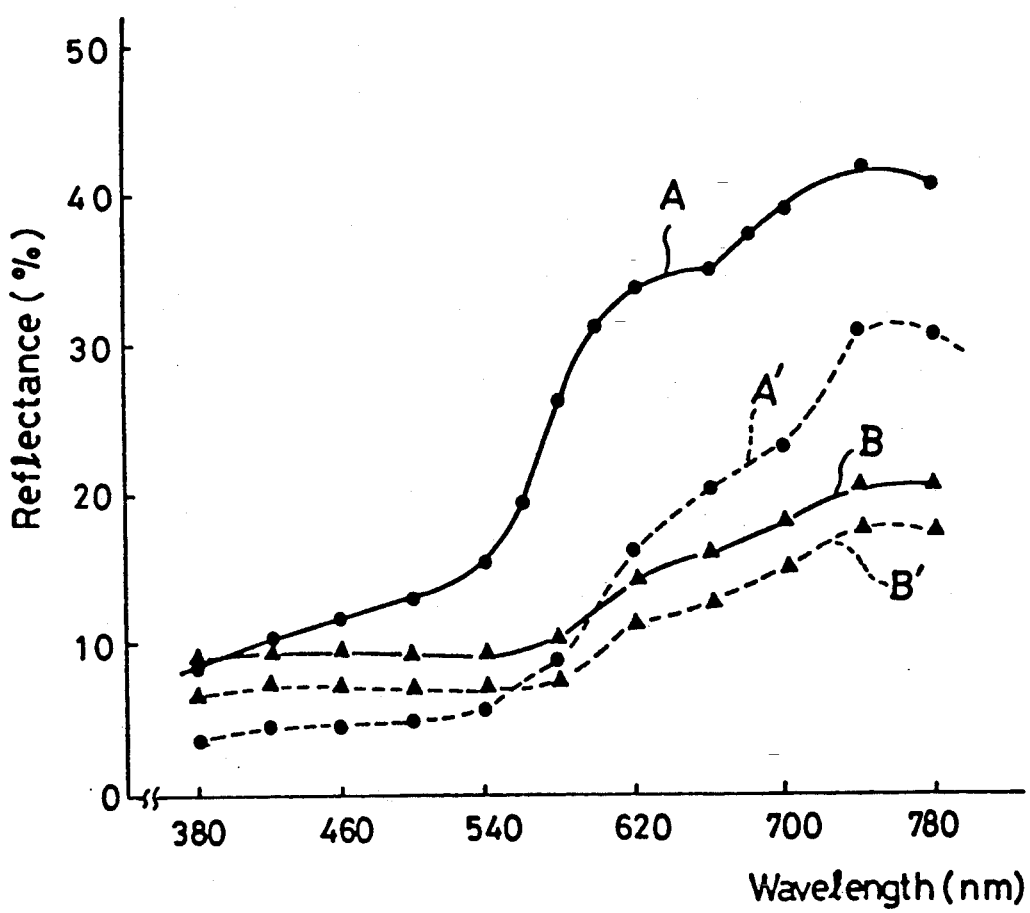
FIG. 6 shows a reflectance (%) to a wavelength (nm) of file pieces in Example 30 and Comparative Example 7.

FIG. 6 shows the reflectance (%) against the wavelength (nm) of each of the film pieces obtained in Example 30 and Comparative Example 7 described below.

In FIG. 6, characters A' and A respectively denote the reflectance curves of the portion of the film piece obtained in the example 30 in which the magnetic field was applied and the portion thereof in which no magnetic field was applied. Characters B' and B respectively denote the reflectance curves of the portion of the film piece obtained in the Comparative Example 7 in which the magnetic field was applied and the portion thereof in which no magnetic field was applied. It is found from FIG. 6 that each of the film pieces obtained by using the plate-like hematite particles according to the present invention, exhibits a high level of reflectance and a large difference between the portion to which the magnetic field was applied and the portion to which no magnetic field was applied, as compared with the film pieces obtained by using the conventional plate-like hematite particles.

Figure 7:
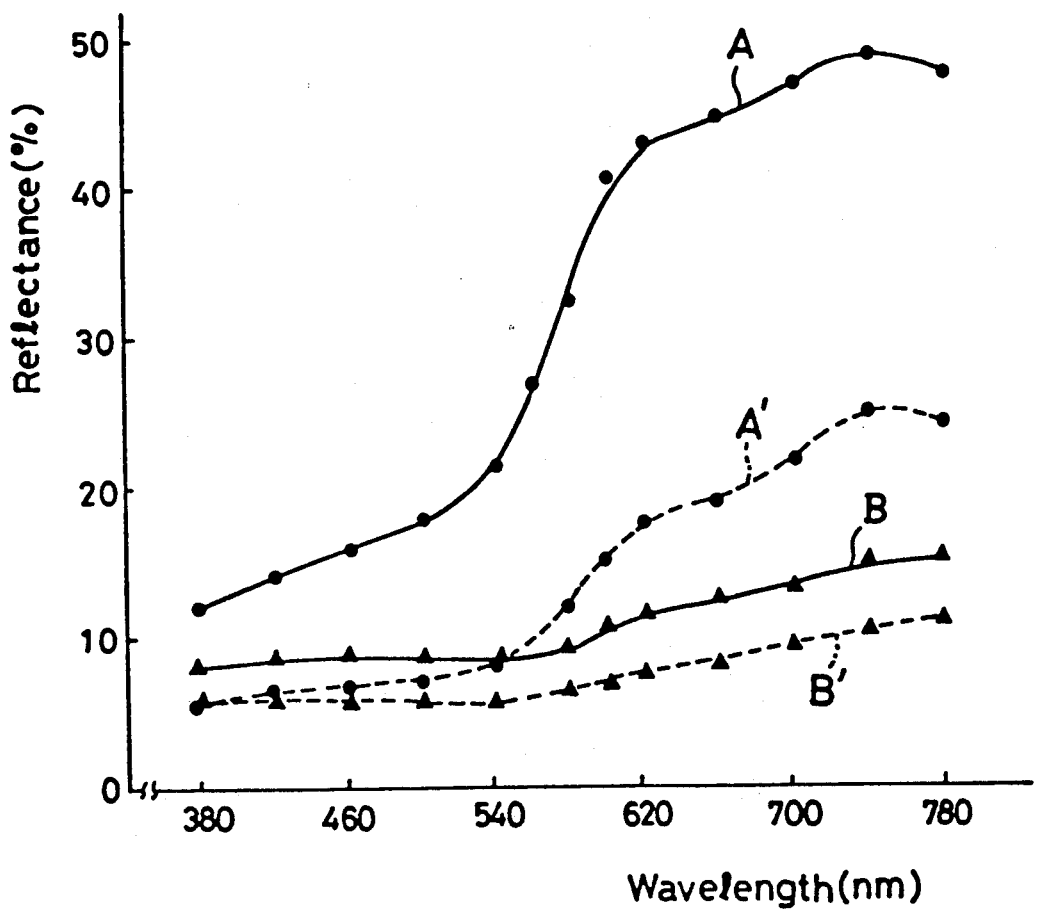
FIG. 7 shows a reflectance (%) to a wavelength (nm) of molded sheet in Example 33 and Comparative example 11.

FIG. 7 shows the reflectance (%) against the wavelength (nm) of each of the molded sheet obtained in Example 33 and Comparative Example 11 described below.

In FIG. 7, characters A' and A respectively denote the reflectance curves of the portion of the molded sheet obtained in the Example 33 in which the magnetic field was applied and the portion thereof in which no magnetic field was applied. Characters B' and B respectively denote the reflectance curves of the portion of the molded sheet obtained in the Comparative Example 11 in which the magnetic field was applied and the portion thereof in which no magnetic field was applied. It is found from FIG. 7 that each of the molded sheet obtained by using the plate-like hematite particles according to the present invention, exhibits a high level of reflectance and a large difference between the portion to which the magnetic field was applied and the portion to which no magnetic field was applied, as compared with the molded sheet obtained by using the conventional plate-like hematite particles.

In the present invention, a magnetic field having a magnetic flux density of 100 to 50,000 gauss may be applied to one side an object to which the magnetic field is applied, or both sides of the object by using a rubber magnet, a sintered magnet, an electromagnet or the like having a surface magnetic flux density of 100 to 50,000 gauss. In the present invention, since the orientation direction of the plate-like hematite particles and the inclination thereof can be easily changed by controlling the strength and the direction of the magnetic flux, the form of a figure can be freely represented.

The paint of the present invention has a lightness $L^*$ of not less than 30, preferably not less than 35, more preferably not less than 39, a hue $\theta^* = \tan^{-1} b^*/a^*$ of not less than 50° and a chroma $C^*ab = \sqrt{a^{*2}+b^{*2}}$ of not less than 17, preferably not less than 20, and shows a golden color.

The rubber or resin composition of the present invention has a lightness $L^*$ of not less than 30, preferably not less than 35, more preferably not less than 40, a hue $\theta^* = \tan^{-1} b^*/a^*$ of not less than 50°, preferably not less than 53°, and a chroma $C^*ab = \sqrt{a^{*2}+b^{*2}}$ of not less than 17, preferably not less than 20, and shows a golden color.

When a three-dimensional picture is drawn by the drawing method of the present invention using a paint, it is possible to obtain a picture of the paint having a color difference ($\Delta E^*$) of not less than 10, preferably not less than 15, and a gloss of not less than 15, and showing a golden color.

When a three-dimensional picture is drawn by the drawing method of the present invention using rubber or resin compositions, it is possible to obtain a picture of the rubber or resin compositions having a color difference ($\Delta E^*$) of not less than 10, preferably not less than 15, and showing a golden color.

The paint, rubber or resin compositions according to the present invention, which is obtained by mixing as a coloring pigment plate-like hematite particles having an average particle diameter of 0.5 to 5.0 μm, a lamellar thickness of 50Å to 500Å and a plate ratio of 50:1 to 500:1 with paint base materials, rubber composition base materials or resin composition base materials, shows a golden color, has excellent stability, and is thus suitable as a pigmented paint, rubber or a resin composition.

Since the paint according to the present invention contains as a color pigment an iron oxide pigment having a plate-like form, it thus exhibits excellent coating properties and an anti-corrosive effect.

The rubber or resin compositions according to the present invention enables the permeability of resin such as polypropylene, polystyrene, PVC or the like which has a high permeability to oxygen and steam, to be reduced as much as possible, and applications as films for packing foods can be thus expected.

The method of drawing a three-dimensional picture in the present invention is capable of drawing a picture having a good feel of three dimensions and thus producing goods having a feel of improved quality and depth. The method of drawing a three-dimensional picture in the present invention also has the effect of producing goods having a feel of further improved quality and depth in combination with the color of the film formed which shows a golden color with metallic luster.

In addition, since the drawing method of the present invention is capable of drawing a three-dimensional picture only by applying a magnetic field in the state wherein the paint is not dried or the kneaded material is flowing, the drawing method is very useful as an industrial and economical method.

The present invention will be explained in more detail in the following Examples; it should be recognized, however, that the scope of the present invention is not restricted to these Examples.

EXAMPLES

The average particle diameters in the following Examples and Comparative Examples are the average values of the values measured from the electron micrographs. The thickness and the plate ratios are represented by the values obtained from the specific surface area measured by the BET method and the above-mentioned average particle diameters.

The $L^*$ value (lightness), $a^*$ and $b^*$ values are represented by the respective values of the samples measured in the Lab space of Hunter by using a color machine CM-1500-A (produced by color machine K.K.) in accordance with the ($L^*$, $a^*$, $b^*$) uniform sensory color space of Commission Internationale de l'Eclairage, CIE (1976).

The samples for measurement were obtained by kneading 0.5 g of hematite particle and 1.0 cc of castor oil by a Huber type muller thereby obtaining a paste and adding 4.5 g of a clear lacquer to the paste thereby obtaining a paint, and coating on cast-coated paper with the paint by using a 6-mil applicator.

The surface gloss of each of the films formed was measured by a glossimeter (manufactured by Nippon Denshoku Kogyo Co., Ltd.) at an incident angle of 60o and expressed by the value by % obtained assuming that a reference value of gloss is 89.0%

PRODUCTION OF PLATE-LIKE HEMATITE PARTICLES

Example 1

An alkaline suspension of pH 13.8 which was obtained by mixing 0.2 mol of o-FeOOH (major axis: 1.0

μm, BET specific surface area 50.2 m²/g), 0.6 mol of NaNO₃ (which is equivalent to 3 mol on the basis of 1 mol of Fe), 4.21 g of water-glass No. 3 (SiO₂:28.55 wt. %, containing 10 mol. % of Si on the basis of the total amount of Fe) and 1.0 mol of NaOH was heated to 280° C. in an autoclave. This temperature was maintained for 2 hours while mechanically stirring the suspension, thereby producing a yellowish brown precipitate.

After the mixture was cooled to room temperature, the yellowish brown precipitate was filtered out. The precipitate was thoroughly washed with water and then dried.

The particles obtained was hematite particles showing a golden color, as shown in the X-ray diffraction pattern of FIG. 1. The average particle diameter was 2.4 μm, the BET specific surface area was 22.6 m²g, the thickness was 180Å and the plate ratio was 133:1, as is clear from the electron micrograph (×5,000) of FIG. 2. In FIG. 1, the peak A represents hematite.

The lightness (L* value) of the particles was 44.9, the hue was 64.5° and the chroma was 27.5.

Examples 2 to 10, Comparative examples 1 to 3

Plate-like hematite particles were produced in the same way as in Example 1 except that the kind and the concentration of the iron material, the amount of NaOH, the kind and the amount of water-soluble salt added, the kind and the amount of Si-containing compound added, the pH of the suspension, and the temperature and the time for autoclaving method were varied as shown in Table 1. The properties of the plate-like hematite particles showing a golden color obtained are shown in Table 1. FIG. 3 is an electron micrograph (×10,000) of the plate-like hematite particles obtained in Example 8.

TABLE 1

| Example and Comparative Example | Iron material Kind | Amount (mol) | Amount of NaOH (mol) | Water-soluble salt Kind | Amount (molar ratio) | Si-containing compound Kind | Amount (mol %) | pH |
|---|---|---|---|---|---|---|---|---|
| Example 1 | Acicular α-FeOOH (Major axis 1.0 μm, BET 50.2 m²/g) | 0.2 | 1.0 | NaNO₃ | 3 | Water-glass No. 3 | 10 | 13.8 |
| Example 2 | Acicular α-FeOOH (Major axis 1.0 μm, BET 50.2 m²/g) | 0.2 | 1.0 | Na₂SO₄ | 1 | Water-glass No. 3 | 10 | 13.8 |
| Example 3 | Acicular α-FeOOH (Major axis 1.0 μm, BET 50.2 m²/g) | 0.2 | 1.0 | NaNO₃ | 15 | Water-glass No. 3 | 15 | 13.8 |
| Example 4 | Acicular α-FeOOH (Major axis 1.0 μm, BET 50.2 m²/g) | 0.2 | 1.0 | NaCl | 5 | Water-glass No. 3 | 10 | 13.8 |
| Example 5 | Acicular α-FeOOH (Major axis 1.0 μm, BET 50.2 m²/g) | 0.1 | 0.1 | Na₂SO₄ | 3 | Water-glass No. 3 | 5 | 12.8 |
| Example 6 | Acicular α-FeOOH (Major axis 1.0 μm, BET 50.2 m²/g) | 0.5 | 1.0 | KCl | 5 | Water-glass No. 3 | 5 | 13.8 |
| Example 7 | Acicular Fe₃O₄ (Major axis 1.0 μm, BET 28.6 m²/g) | 0.1 | 3.0 | KNO₃ | 15 | Water-glass No. 3 | 20 | 14.3 |
| Example 8 | Spindle α-FeOOH (Major axis 0.18 μm, BET 150 m²/g) | 0.2 | 1.0 | NaNO₃ | 5 | Water-glass No. 3 | 10 | 13.8 |
| Example 9 | Acicular α-FeOOH (Major axis 2.0 μm, BET 13.4 m²/g) | 0.2 | 1.0 | NaNO₃ | 3 | Water-glass No. 3 | 10 | 13.8 |
| Example 10 | Acicular α-FeOOH (Major axis 0.15 μm, BET 102 m²/g) | 0.2 | 1.0 | NaNO₃ | 3 | Colloidal silica | 10 | 13.8 |
| Comparative Example 1 | Acicular α-FeOOH in Ex. 1 | 0.2 | 1.0 | — | — | — | — | 13.8 |
| Comparative Example 2 | Acicular α-FeOOH in Ex. 1 | 0.2 | 1.0 | — | — | Water-glass No. 3 | 10 | 13.8 |
| Comparative Example 3 | Acicular α-FeOOH in Ex. 1 | 0.2 | 1.0 | NaNO₃ | 3 | — | — | 13.8 |

| Example and Comparative Example | Auto claving treatment Temperature (°C.) | time (hours) | Average diameter d (μm) | Thickness t (Å) | Plate ratio (Average diameter: thickness) | Lightness L* | Hue $\theta° = \tan^{-1} b^*/a^*$ | Chroma $C_{ab}^* = \sqrt{a^{*2} + b^{*2}}$ |
|---|---|---|---|---|---|---|---|---|
| Example 1 | 280 | 2 | 2.4 | 180 | 133:1 | 44.9 | 64.5 | 27.5 |
| Example 2 | 280 | 4 | 1.8 | 170 | 106:1 | 42.3 | 60.3 | 25.1 |
| Example 3 | 300 | 2 | 3.1 | 265 | 117:1 | 43.1 | 63.1 | 27.4 |
| Example 4 | 250 | 4 | 2.7 | 240 | 123:1 | 45.1 | 64.1 | 28.3 |
| Example 5 | 280 | 2 | 0.8 | 95 | 84:1 | 41.7 | 54.7 | 23.4 |
| Example 6 | 250 | 4 | 2.9 | 260 | 112:1 | 44.2 | 60.7 | 23.7 |
| Example 7 | 280 | 4 | 3.9 | 300 | 130:1 | 40.5 | 54.5 | 23.6 |
| Example 8 | 250 | 4 | 1.2 | 85 | 126:1 | 44.2 | 59.8 | 24.6 |
| Example 9 | 280 | 2 | 4.5 | 355 | 127:1 | 41.3 | 53.8 | 22.5 |
| Example 10 | 300 | 2 | 0.5 | 75 | 67:1 | 41.2 | 54.3 | 23.1 |
| Comparative Example 1 | 280 | 2 | 1.2 | 3510 | 3.4:1 | 20.5 | 17.2 | 14.3 |
| Comparative Example 2 | 280 | 2 | 0.8 | 220 | 36:1 | 38.9 | 47.5 | 16.4 |
| Comparative Example 3 | 280 | 2 | 2.6 | 2590 | 10:1 | 23.1 | 12.1 | 8.7 |

Example 11

An alkaline suspension of pH 13.8 which was obtained by mixing 0.2 mol of Fe(NO$_3$)$_3$, 0.6 mol of NaNO$_3$ (which is equivalent to 3 mol on the basis of 1 mol of Fe), 4.21 g of water-glass No. 3 (SiO$_2$:28.55 wt. %, containing 10 mol. % of Si on the basis of the total amount of Fe) and 1.6 mol of NaOH was heated to 200° C. in an autoclave. This temperature was maintained for 2 hours while mechanically stirring the suspension, thereby producing a yellowish brown precipitate. The NaNO$_3$ in the alkaline suspension is equivalent to 3.6 mol on the basis of 1 mol of Fe in the total amount of by-product salt and NaNO$_3$ added.

After the mixture was cooled to room temperature, the yellowish brown precipitate was filtered out. The precipitate was thoroughly washed with water and then dried.

Figure 5:
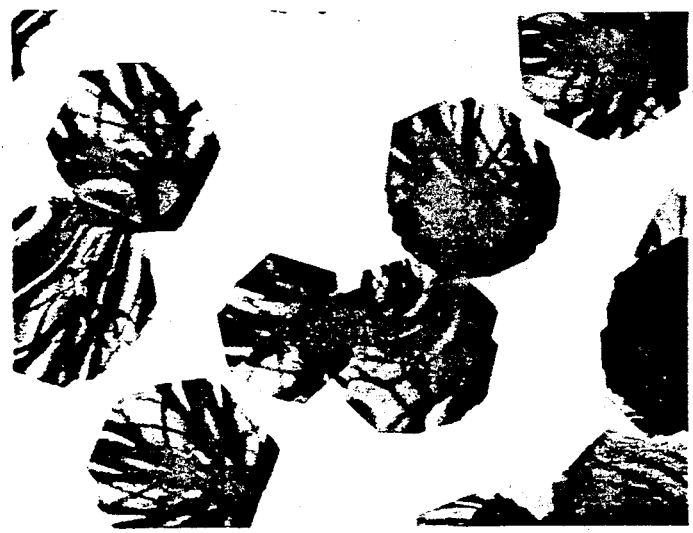

The particles obtained was hematite particles showing a golden color, as shown in the X-ray diffraction pattern of FIG. 4. The average particle diameter was 2.4 μm, the BET specific surface area was 20.4 m$^2$/g, the thickness was 200Å and the plate ratio was 120:1, as is clear form the electron micrograph (×10,000) of FIG. 5. In FIG. 4, the peak A represents hematite.

The lightness (L* value) of the particles was 43.6, the hue was 64.3° and the chroma was 26.4.

Examples 12 to 17, Comparative examples 4 to 6

Plate-like hematite particles were produced in the same way as in example 11 except that the kind and the concentration of the ferric salt, the amount of NaOH, the kind and the content of water-soluble salt added, the kind and the content of Si-containing compound added, the pH of the suspension, and the temperature and the time for autoclaving treatment were varied as shown in Table 2. The properties of the hematite particles showing a golden color obtained are shown in Table 2.

In the Comparative example 5, as an iron material in the autoclaving method, Fe(OH)$_3$ obtained by neutralizing Fe(NO$_3$)$_3$ with NaOH and sufficiently washing the resultant Fe(OH)$_3$ to remove a water-soluble salt was used.

TABLE 2

| | | | | Conditions for producing plate-like hematite particles | | | | | | |
|---|---|---|---|---|---|---|---|---|---|---|
| | | | Amount | Water-soluble salt | | | | Si-containing | | |
| Example and | Iron material | | of | By-product salt | | Salt added | | Content ratio | compound | | |
| Comparative Example | Kind | Amount (mol) | NaOH (mol) | Kind | Amount (molar ratio) | Kind | Amount (molar ratio) | (molar ratio) | Kind | Content (mol %) | pH |
| Example 11 | Fe(NO$_3$)$_3$ | 0.2 | 1.6 | NaNO$_3$ | 0.6 | NaNO$_3$ | 3.0 | 3.6 | Water-glass No. 3 | 10 | 13.8 |
| Example 12 | FeCl$_3$ | 0.5 | 2.5 | NaCl | 1.5 | Na$_2$SO$_4$ | 2.0 | 3.5 | Water-glass No. 3 | 10 | 13.8 |
| Example 13 | Fe$_2$(SO$_4$)$_3$ | 0.1 | 3.6 | Na$_2$SO$_4$ | 0.15 | KNO$_3$ | 3.0 | 3.15 | Water-glass No. 3 | 20 | 14.3 |
| Example 14 | Fe(NO$_3$)$_3$ | 0.2 | 0.7 | NaNO$_3$ | 0.6 | KCl | 3.0 | 3.6 | Water-glass No. 3 | 5 | 12.8 |
| Example 15 | " | 0.2 | 1.6 | " | 0.6 | NaCl | 14.0 | 14.6 | Water-glass No. 3 | 15 | 13.8 |
| Example 16 | FeCl$_3$ | 0.1 | 1.3 | NaCl | 0.3 | " | 5.0 | 5.3 | Colloidal Silica | 10 | 13.8 |
| Example 17 | " | 0.2 | 1.6 | " | 0.6 | Na$_2$SO$_4$ | 1.0 | 1.6 | Water-glass No. 3 | 13 | 13.8 |
| Comparative Example 4 | Fe(NO$_3$)$_3$ | 0.2 | 1.6 | NaNO$_3$ | 0.6 | — | — | 0.6 | — | — | 13.8 |
| Comparative Example 5 | " | 0.2 | 1.6 | " | 0 | — | — | 0 | Water-glass No. 3 | 10 | 13.8 |
| Comparative Example 6 | " | 0.2 | 1.6 | " | 0.6 | NaNO$_3$ | 3.0 | 3.6 | — | — | 13.8 |

| | Conditions for producing plate-like hematite particles | | Properties of plate-like hematite particles | | | | | |
|---|---|---|---|---|---|---|---|---|
| | Auto claving treatment | | | | | | | Chroma *Cab = |
| Example and Comparative Example | Temperature (°C.) | time (hours) | Average diameter d (μm) | Thickness t (Å) | Plate ratio (Average diameter: thickness) | Lightness L* | Hue θ* = tan$^{-1}$ b*/a* | $\sqrt{a^{*2} + b^{*2}}$ |
| Example 11 | 200 | 2 | 2.4 | 200 | 120:1 | 43.6 | 64.3 | 26.4 |
| Example 12 | 280 | 2 | 2.0 | 180 | 111:1 | 42.4 | 62.1 | 27.3 |
| Example 13 | 250 | 2 | 3.2 | 290 | 110:1 | 43.1 | 59.8 | 26.8 |
| Example 14 | 200 | 2 | 1.0 | 110 | 91:1 | 42.1 | 55.6 | 24.3 |
| Example 15 | 250 | 2 | 3.5 | 270 | 130:1 | 44.2 | 60.0 | 26.7 |
| Example 16 | 200 | 2 | 2.7 | 240 | 113:1 | 43.6 | 63.1 | 27.0 |
| Example 17 | 260 | 4 | 1.8 | 170 | 106:1 | 40.0 | 62.0 | 23.0 |
| Comparative Example 4 | 200 | 2 | 1.2 | 3230 | 3.7:1 | 22.1 | 17.9 | 15.3 |
| Comparative Example 5 | 200 | 2 | 0.8 | 230 | 35:1 | 37.7 | 46.7 | 18.3 |
| Comparative Example 6 | 200 | 2 | 2.5 | 2560 | 9.8:1 | 24.1 | 13.2 | 9.1 |

PRODUCTION OF PAINT

Example 18

10 parts by weight of the plate-like hematite particles obtained in Example 1 as a color pigment were mixed with paint base materials having the composition set forth below and dispersed therein while being blended for 24 hours by using a ball mill (using a medium glass beads of a diameter of 10 mm), thereby obtaining a paint.

| | |
|---|---|
| Epoxyester resin (solid content: 50 wt%) | 62 parts by weight |
| Polyamide amine | 30 parts by weight |
| Lauroyl peroxide | 7 parts by weight |

The thus-obtained paint was coated in a thickness of about 100 μm on a steel plate by using an air-spray gun and cured at 60° C. to form a film. A piece of the film exhibited a Lightness $L^*$ of 44, a Hue $\theta^*$ of 63° and a Chroma $C^*ab$ of 28 and showed a golden color with metallic luster.

Example 19

20 parts by weight of the plate-like hematite particles obtained in Example 4 as a color pigment were mixed with paint base materials having the composition set forth below and dispersed therein while being blended for 24 hours by using a ball mill (using glass beads of a diameter of 10 mm), thereby obtaining a paint.

| | |
|---|---|
| Melamine resin | 15 parts by weight |
| Dry alkyd resin | 85 parts by weight |

The thus-obtained paint was coated in a thickness of about 150 μm on a glass plate by using an air-spray gun and then cured by baking at 120° C. for 30 minutes to form a film. A piece of the film formed exhibited a Lightness $L^*$ of 43, a Hue $\theta^*$ of 60° and a Chroma $C^*ab$ of 27 and showed a golden color with metallic luster.

Example 20

20 parts by weight of the plate-like hematite particles obtained in Example b 6 as a color pigment were mixed with paint base materials having the composition set forth below and then dispersed therein while being blended for 24 hours by using a ball mill (using as a medium glass beads of a diameter of 10 mm), to obtain a paint.

| | |
|---|---|
| Melamine resin | 30 parts by weight |
| Non-drying alkyd resin | 70 parts by weight |

The thus-obtained paint was coated in a thickness of about 100 μm on a metal plate by using an air-spray gun and then cured by baking at 140° C. for 30 minutes to form a film. A piece of the film exhibits a Lightness $L^*$ of 42, Hue $\theta^*$ of 58° and a Chroma $C^*ab$ of 22 and showed a golden color with metallic luster.

Example 21

100 parts by weight of the plate-like hematite particles obtained in Example 7 as a color pigment were mixed with paint base materials having the composition set forth below and then dispersed therein while being blended for 24 hours by using a ball mill (using as a medium glass beads of a diameter of 10 mm) to obtain a paint.

| | |
|---|---|
| Phenol novolak resin | 90 parts by weight |
| Hexamethylenetetramine | 7 parts by weight |

The thus-obtained paint was coated in a thickness of about 75 μm on a glass plate by using an air-spray gun and then cured at 40° C. to form a film. A piece of the film found exhibited a Lightness $L^*$ of 39, a Hue $\theta^*$ of 52° and chroma $C^*ab$ of 23 and showed a golden color with metallic luster.

Example 22

5 parts by weight of the plate-like hematite particles obtained in Example 8 as a color pigment were mixed with paint base materials having the composition set forth below and then dispersed therein while being blended for 24 hours by using a ball mill (using as a medium glass beads of a diameter of 10 mm), thereby obtaining a paint.

| | |
|---|---|
| Cellulose thickener | 7.1 parts by weight |
| Water | 5.4 parts by weight |
| Dispersant | 0.4 part by weight |
| Nonionic surfactant | 0.1 part by weight |
| Emulsion of acrylic polymer | 36 parts by weight |

The thus-obtained paint was coated in a thickness of about 100 μm on a polyvinyl chloride film by using an air-spray gun and then cured by drying at 30° C. to form a film. A piece of the film exhibited a Lightness $L^*$ of 43, a Hue $\theta^*$ of 58° and a Chroma $C^*ab$ of 24 and showed a golden color with metallic luster.

Example 23

10 parts by weight of the plate-like hematite particles obtained in Example 9 as a color pigment were mixed with paint base material having the composition set forth below and then dispersed therein while being blended for 24 hours by using a ball mill (using as a medium glass beads of a diameter of 10 mm), thereby obtaining a paint.

| | |
|---|---|
| Melamine resin (NV = 46.1%) | 108 parts by weight |
| Thinner | 15 parts by weight |

The thus-obtained paint was coated in a thickness of about 100 μm on a steel plate by using an air-spray gun and then cured by drying at 30° C. to form a film. A piece of the film exhibited a Lightness $L^*$ of 40, a Hue $\theta^*$ of 52° and a Chroma $C^*ab$ of 22 and showed a golden color with metallic luster.

PRODUCTION OF RUBBER OF RESIN COMPOSITION

Example 24

2 parts by weight of the plate-like hematite particles obtained in Example 1 as a color pigment were mixed with resin composition base materials having the composition set forth below and then kneaded at 130° C. for 5 minutes using two rolls, thereby obtaining a kneaded material.

| | |
|---|---|
| Polystyrene resin | 98 parts by weight |
| Calcium stearate | 0.1 part by weight |

The thus-obtained kneaded material was formed in to a sheet film by using a hot press at a temperature of 200° C. and then cured by cooling.

The thus-formed sheet film had tensile strength of 740 kg/cm² and elongation of 3.5% and thus was fit for used as a resin molded product. The sheet film exhibited a Lightness L* of 46, a Hue $\theta^*$ of 64° a Chroma C*ab of 28 and showed a golden color with metallic luster.

Examples 25 to 27

Sheet films were obtained by the same way as in example 24 except that the kind and the amounts of the hematite particles, the resin and the additives were changed as shown in Table 3.

The main production conditions used and various properties are shown in Table 3.

All the sheet films obtained in examples 25 to 27 were fit for use as resin molded products and showed a golden color with metallic luster.

The sheet film obtained in Example 25 exhibited tensile strength of 310 kg/cm² and elongation of 700%.

Example 28

10 parts by weight of the plate-like hematite particles obtained in Example 6 as a coloring pigment were kneaded with 200 parts by weight of epoxy resin, 30 parts by weight of polyamide amine and 7 parts by weight of lauroyl peroxide for 24 hours by using a ball mill, and the resultant mixture was then formed into a sheet film.

The thus-formed sheet film was fit for use as a resin molded product. The sheet film exhibited a Lightness L* of 44.5, a Hue $\theta^*$ of 61° and a Chroma C*ab of 24 and showed a golden color with metallic luster.

Example 29

15 parts by weight of the plate-like hematite particles obtained in Example 9 as a color pigment were mixed with rubber base materials having the composition set forth below and then kneaded at 82° C. for 15 minutes by using two rolls, thereby obtaining a kneaded material.

| | |
|---|---|
| Nitrile butadiene rubber | 80 parts by weight |
| DOP | 7.5 parts by weight |
| Stearic acid | 1.5 parts by weight |
| Zinc oxide | 4 parts by weight |
| Sulfur | 1.5 parts by weight |
| Vulcanization accelerator (N-cyclohexylbenzithiazyl sulfenamide) | 1.5 parts by weight |

The thus-obtained kneaded material was formed into a sheet film, vulcanized at 150° C. and then cured by cooling.

The thus-formed sheet film had a tensile strength of 100 kg/cm² and an elongation of 300%, and was fit for use as a rubber molded product. The sheet film also exhibited a Lightness L* of 42, a Hue $\theta^*$ of 54° and a Chroma C*ab of 23 and showed a golden color with metallic luster.

TABLE 3

| | Rubber or Resin Composition | | | | | | Molded product | | |
|---|---|---|---|---|---|---|---|---|---|
| | Plate-like hematite particle | | Rubber or resin | | Additives | | Lightness | Hue | Chroma |
| Example | Kind | Amount[1] | Kind | Amount[1] | Kind | Amount[1] | L* | $\theta^*$ | C*ab |
| Example 24 | Example 1 | 2 | Polystryrene resin | 98 | Calcium stearate | 0.1 | 46 | 64 | 28 |
| 25 | 17 | 3 | Polypropylene resin | 97 | Calcium stearate | 0.2 | 41 | 63 | 24 |
| 26 | 3 | 5 | Low-density polyethylene resin | 95 | Calcium stearate | 0.1 | 44 | 63 | 26 |
| 27 | 4 | 0.5 | Polyvinyl chloride resin | 99.5 | DOP<br>Dibutyl malate<br>Stearic acid | 10<br>2<br>0.4 | 46 | 65 | 29 |
| 28 | 6 | 10 | Epoxy resin | 200 | Polyamide amine<br>Lauroyl peroxide | 30<br>7 | 44.5 | 61 | 24 |
| 29 | 9 | 15 | Nitrile butadiene rubber | 80 | DOP<br>Stearic acid<br>Zinc oxide<br>Sulfur<br>Vulcanization accelerator | 7.5<br>1.5<br>4<br>1.5<br>1.5 | 42 | 54 | 23 |

[1] parts by weight

METHOD OF DRAWING THREE-DIMENSIONAL PICTURE

Example 30

0.5 g of plate-like hematite particles having an average diameter of 2.4 μm, a thickness of 180Å and a plate ratio (average diameter:thickness) of 133:1 and 1.0 cc of castor oil were kneaded together to form a paste. 4.5 g of clear lacquer was added to the thus-formed paste and kneaded therewith to form a paint. The thus-obtained paint was then coated on cast-coated paper by using an applicator of 6 mil. A magnetic field was then applied to the coated material in the direction vertical to the material by using a cylindrical rubber magnet (diameter:3 cm, thickness: 1 cm) having a surface magnetic flux density of 800 gauss at a distance of 3 mm from the rear side of the cast-coated paper, followed by drying to form a film.

A piece of the thus-obtained film exhibited a golden color with metallic luster and had a portion to which the magnetic field was applied and in which a circular image corresponding to the cylindrical rubber magnet used was drawn in a ⊔-shaped form.

Various properties of the film piece are shown in Table 4. As shown in Table 4, the color difference between the portion to which the magnetic field was applied and the portion to which no magnetic field was applied is large.

Example 31

10 parts by weight of plate-like hematite particles having an average diameter of 4.5 μm, a thickness of 355Å and a plate ratio (average particle diameter: thickness) of 127:1 were mixed with a paint base materials having the composition set forth below and dispersed therein while being blended for 24 hours by using a ball mill (using as a medium glass beads of a diameter of 10 mm), thereby obtaining a paint.

| | |
|---|---|
| Epoxyester resin (solid content; 50 wt%) | 62 parts by weight |
| Polyamide amine | 30 parts by weight |
| Lauroyl peroxide | 7 parts by weight |

The thus-obtained paint was coated in a thickness of about 100 μm on a glass plate having a thickness of 2 mm by using an air-spray gun. A magnetic field was then applied to the coated material in the direction vertical thereto by using a cylindrical rubber magnet (diameter: 3 cm, thickness: 1 cm) having a surface magnetic flux density of 800 gauss at a distance of 3 mm from the rear side of the glass plate, followed by curing at 60° C. to form a film.

A piece of the thus-formed film showed a golden color with metallic luster and had a portion to which the magnetic field was applied and in which a circular picture corresponding to the cylindrical rubber magnet used was drawn in a -shaped form.

Various properties of the film piece are shown in Table 4. As shown in Table 4, a color difference between the portion to which the magnetic field was applied and the portion to which no magnetic field was applied is large.

EXAMPLE 32

5 parts by weight of plate-like hematite particles having an average diameter of 0.8 μm, a thickness of 95Å and a plate ratio (average diameter:thickness) of 84:1 were mixed with a paint base materials having the composition set forth below and dispersed therein while being mixed for 24 hours by using a ball mill (using as a medium glass beads of a diameter of 10 mm), thereby obtaining a paint.

| | |
|---|---|
| Melamine resin | 30 parts by weight |
| Non-drying alkyd resin | 70 parts by weight |

The thus-obtained paint was then coated in a thickness of about 100 μm on an aluminum plate having a thickness of 0.5 mm by using an air-spray gun. A magnetic field was then applied to the coated material in the direction vertical thereto by using a cylindrical rubber magnet (diameter: 3 cm, thickness: 1 cm) having a surface magnetic flux density of 800 gauss at a distance of 3 mm from the rear side of the metal plate, followed by curing by baking for 30 minutes at 140° C. to form a film.

A piece of the thus-formed film showed a golden color with metallic luster and had the portion to which the magnetic field was applied and in which a circular picture corresponding to the cylindrical rubber magnet used was drawn in a ⊔-shaped form.

Various properties of the film piece are shown in Table 4. As shown in Table 4, a color difference between the portion to which the magnetic field was applied and the portion to which no magnetic field was applied is large.

Comparative examples 7 to 10

Film pieces were obtained by the same method as in Example 30 except that the kind of the pigment was changed as shown in Table 4.

Various properties of each of the film pieces obtained are shown in Table 4.

The film obtained in each of Comparative Examples 7, 9 and 10 exhibited a small color difference between the portion to which the magnetic field was applied and the portion to which no magnetic field was applied and had a three-dimensional picture which was unsatisfactorily developed.

The film obtained in Comparative Example 8 exhibited a large color difference between the portion to which the magnetic field was applied and the portion to which no magnetic field was applied and had a good three-dimensional picture developed which showed a light brown color without luster.

TABLE 4

| Example and Comparative Example | Kind of Pigment | Application of Magnetic Field | Lightness L* Value | Hue θ° | Chroma C*ab | Color difference (ΔE*) | Gloss |
|---|---|---|---|---|---|---|---|
| Example | | | | | | | |
| 30 | Plate-like hematite particles (average diameter 2.4 μm, thickness 180 Å, plate ratio | No Application | 53.0 34.2 | 52.4 36.3 | 28.1 25.0 | — 20.4 | 85.0 55.1 |

TABLE 4-continued

| Example and Comparative Example | Kind of Pigment | Application of Magnetic Field | Lightness L* Value | Hue θ° | Chroma C*ab | Color difference (ΔE*) | Gloss |
|---|---|---|---|---|---|---|---|
| | 133:1) | | | | | | |
| 31 | Plate-like hematite particles (average diameter 4.5 μm, thickness 355 Å, plate ratio 127:1) | No Application | 44.6 30.1 | 43.9 33.6 | 22.2 10.0 | — 19.1 | 39.8 15.1 |
| 32 | Plate-like hematite particles (average diameter 0.8 μm, thickness 95 Å, plate ratio 84:1) | No Application | 42.8 33.3 | 44.7 36.9 | 18.3 15.5 | — 10.2 | 69.1 56.0 |
| Comparative Example | | | | | | | |
| 7 | Plate-like hematite particles (average diameter 5.0 μm, thickness 1500 Å, plate ratio 33:1) | No Application | 38.5 34.0 | 10.7 15.5 | 10.0 9.6 | — 4.7 | 55.4 22.6 |
| 8 | Plate-like maghemite particles (average diameter 2.4 μm, thickness 180 Å, plate ratio 133:1) | No Application | 43.4 33.4 | 56.1 43.1 | 17.39 13.7 | — 11.2 | 51.2 9.9 |
| 9 | Plate-like barium ferrite particles (average diameter 2.0 μm, thickness 1000 Å, plate ratio 20:1) | No Application | 35.8 35.4 | 46.8 44.6 | 9.1 8.7 | — 0.6 | 55.1 25.7 |
| 10 | Plate-like magnetite particles (average diameter 1.0 μm, thickness 500 Å, plate ratio 20:1) | No Application | 29.1 25.6 | 95.1 112.8 | 2.6 0.4 | — 4.10 | 28.3 12.7 |

The color differences are respectively expressed by the values obtained from measurements using as a reference the portions to which no magnetic field was applied.

Example 33

2 parts by weight of hematite particles having an average diameter of 2.4 μm, a thickness of 180Å and a plate ratio of 133:1 as a coloring pigment were mixed with a resin composition base materials having the composition set forth below and kneaded therewith for 5 minutes at 130° C. by using two rolls to form a kneaded material.

| Polystyrene resin | 98 parts by weight |
|---|---|
| Calcium stearate | 0.1 part by weight |

The thus-formed kneaded material was then molded into a sheet having a thickness of 0.5 mm by using a hot press at a temperature of 200° C. while a magnetic field being applied in the direction vertical to the press surface by using a cylindrical magnet (diameter: 3 cm, thickness: 1 cm) having a surface magnetic flux density of 800 gauss at a distance of 3 mm from the press, followed by cool-curing using a cold press.

The thus-formed molded sheet exhibited a golden color with metallic luster and had a portion to which the magnetic field was applied and in which a circular picture corresponding to the cylindrical magnet used was drawn in a U-shaped form.

Various properties of the molded sheet are shown in Table 5.

As shown in Table 5, the color difference between the portion to which the magnetic field was applied and the portion to which no magnetic field was applied is large.

Example 34, Comparative Example 11

Molded sheets having a thickness of 3 mm were obtained by the same method as in Example 33 except that the kinds and the amounts of the pigment, the resin and the additives were changed as shown in Table 5.

The molded sheet obtained in Example 34 showed a golden color with metallic luster and had a portion to which the magnetic field was applied and in which a circular picture corresponding to the cylindrical magnet used was drawn in a U-shaped form. Various properties of the molded sheet are shown in Table 5. As shown in Table 5, the color difference between the portion to which the magnetic field was applied and the portion to which no magnetic field was applied is large.

The molded sheet obtained in Comparative Example 11 exhibited a small color difference between the portion to which the magnetic field was applied and the portion to which no magnetic field was applied and had a figure drawn having unsatisfactory feeling of three dimensions.

Example 35

5 parts by weight of plate-like hematite particles having an average diameter of 0.8 μm, a thickness of 95Å and a plate ratio of 84:1 were mixed in a resin composition base materials having the composition set forth below and then kneaded therewith for 24 hours by using a ball mill (using as a medium glass beads having a diameter of 10 mm) to form a kneaded material.

| Epoxyester resin (solid content, 50%) | 62 parts by weight |
|---|---|
| Polyamide amine | 30 parts by weight |
| Lauroyl peroxide | 7 parts by weight |

The thus-formed kneaded material was then cast in a mold in the form of a rectangular parallelepiped having a width 100 mm, a length of 200 mm and a depth of 5 mm and then cured by heating at 60° C. for 12 hours while applying a magnetic field to the bottom of the mold in the direction vertical thereto by using a cylindrical magnet having a surface magnetic flux density of 800 gauss (diameter: 3 cm, thickness: 1 cm) at a distance of 3 mm from the bottom to form a molded sheet having a thickness of 5 mm.

The thus-formed molded sheet exhibited a golden color with metallic luster and had the portion to which the magnetic field was applied and in which a circular picture corresponding to the cylindrical magnet used was drawn in a -shaped form.

Various properties of the molded sheet are shown in Table 5.

In Table 5, each of Lightness L*, Hue $\theta^*$ and Chroma C*ab and color differences ($\Delta E^*$) is expressed by a value for the surface to which the magnetic field was applied. As shown in Table 5, the color difference between the portion to which the magnetic field was applied and the portion to which no magnetic field was applied is large.

average particle diameter to the thickness) of 50:1 to 500:1.

6. An iron oxide pigment according to claim 5, wherein said plate-like hematite particles have further a lightness (L* value) of not less than 30, a hue ($\theta^* = \tan^{-1} b^*/a^*$) of not less than 50°, and a chroma (C*ab = $\sqrt{a^{*2}+b^{*2}}$) of not less than 17 (wherein L*, a* and b* are values represented by the (L*, a*, b*) uniform sensory color space of the CIE 1976).

7. An iron oxide pigment according to claim 5, wherein said plate-like hematite particles have an average particle diameter of 1.0 to 4.0 μm, a lamellar thickness of 100Å to 400Å, a plate ratio of 100:1 to 300:1, a lightness (L* value) of not less than 35, a hue ($\theta^* = \tan^{-1} b^*/a^*$) of not less than 50°, and a chroma (C*ab = $\sqrt{a^{*2}+b^{*2}}$) of not less than 20.

8. A process for producing plate-like hematite particles according to claim 1, said process comprising auto-

TABLE 5

| Example and Comparative Example | Pigment | | Rubber or Resin Composition | | | | Application of magnetic field | Molded Product | | | |
|---|---|---|---|---|---|---|---|---|---|---|---|
| | | | Rubber or Resin | | Additive | | | Lightness (L*) | Hue (θ*) | Chroma (C*ab) | Color difference (ΔE*) |
| | Kind | Amount[1] | Kind | Amount[1] | Kind | Amount[1] | | | | | |
| Example 33 | Plate-like hematite particles (average diameter 2.4 μm, thickness 180 Å, plate ratio 133:1) | 2 | Polystyrene resin | 98 | Calcium stearate | 0.1 | No Application Application | 59.9 38.6 | 53.8 42.5 | 28.4 20.2 | — 23.2 |
| Example 34 | Plate-like hematite particles (average diameter 4.5 μm, thickness 355 Å, plate ratio 127:1) | 5 | High-density polyethylene resin | 95 | Calcium stearate | 0.1 | No Application Application | 46.5 24.2 | 44.7 33.1 | 26.0 13.2 | — 25.9 |
| Example 35 | Plate-like hematite particles (average diameter 0.8 μm, thickness 95 Å, plate ratio 84:1) | 5 | Epoxy ester resin | 62 | Polyamide amine Laurol peroxide | 30 7 | No Application Application | 45.4 27.5 | 45.4 34.7 | 20.5 17.8 | — 18.1 |
| Comparative Example 11 | Plate-like hematite particles (average diameter 5.0 μm, thickness 1500 Å, plate ratio 33:1) | 2 | Polystyrene resin | 98 | Calcium stearate | 0.1 | No Application Application | 36.5 30.1 | 16.3 16.4 | 6.7 4.9 | — 6.6 |

[1] parts by weight

What is claimed is:

1. Plate-like hematite particles having an average particle diameter of 0.5 to 5.0 μm, lamellar thickness of 50Å to 500Å and a plate ratio (the ratio of the average particle diameter to the thickness) of 50:1 to 500:1.

2. Plate-like hematite particles according to claim 1, which further have a lightness (L* value) of not less than 30, a hue ($\theta^* = \tan^{-1} b^*/a^*$) of not less than 50°, and a chroma (C*ab = $\sqrt{a^{*2}+b^{*2}}$) of not less than 17 (wherein L*, a* and b* are values represented by the (L*, a*, b*) uniform sensory color space of the CIE 1976).

3. Plate-like hematite particles according to claim 1, which further show a golden color.

4. Plate-like hematite particles according to claim 1, which have an average particle diameter of 1.0 to 4.0 μm, a lamellar thickness of 100Å to 400Å, a plate ratio of 100:1 to 300:1, a lightness (L* value) of not less than 35, a hue ($\theta^* = \tan^{-1} b^*/a^*$) of not less than 50°, and a chroma (C*ab = $\sqrt{a^{*2}+b^{*2}}$) of not less than 20.

5. An iron oxide pigment showing a golden color and comprising plate-like hematite particles having an average particle diameter of 0.5 to 5.0 μm, a lamellar thickness of 50Å to 500Å and a plate ratio (the ratio of the claving an alkaline suspension of iron (III) hydroxide oxide particles, FeOx Fe$_2$O$_3$ ($0 \leq X \leq 1$) particles or a ferric salt, the said alkaline suspension having a pH of not less than 9 and containing 0.1 to 15.0 mol of water-soluble salt based on 1 mol of Fe, and a Si-containing compound of 1.5 to 20.0 mol. %, expressed as Si, based on the total amount of Fe in the alkaline suspension.

9. A process according to claim 8, wherein the autoclave method is carried out at a temperature of 150 to 330°C.

10. Plate-like hematite particles having an average particle diameter of 0.5 to 5.0 μm, a lamellar thickness of 50Å to 500Å and a plate ratio (the ratio of the average particle diameter to the thickness) of 50:1 to 500:1, produced by a process according to claim 8.

11. A paint, rubber or resin composition showing a golden color and comprising plate-like hematite particles having an average particle diameter of 0.5 to 5.0 μm, a lamellar thickness of 50Å to 500Å and a plate ratio of 50:1 to 500:1 and paint, rubber or resin composition base materials.

12. A paint according to claim 11, wherein an amount of said plate-like hematite particles is 0.1 to 200 parts by weight based on 100 parts by weight of said paint base materials.

13. A rubber or resin composition according to claim 11, wherein an amount of said plate-like hematite particles is 0.1 to 90 parts by weight based on 100 parts by weight of said rubber or resin composition base materials.

14. A method of drawing a three-dimensional picture, comprising coating on the surface of a molded product a paint comprising plate-like hematite particles having an average particle diameter of 0.5 to 5.0 μm, a lamellar thickness of 50Å to 500Å and a plate ratio of 50:1 to 500:1 and paint base materials, and applying a magnetic field in a undried state to draw on the surface of said molded product a picture formed by controlling the strength and the direction of said magnetic flux.

15. A drawing method according to claim 14, wherein said paint comprises 0.1 to 200 parts by weight of said plate-like hematite particles based on 100 parts by weight of said paint base materials.

16. A drawing method according to claim 14 wherein a magnetic field having a magnetic flux density of 100 to 50,000 gauss is applied.

17. A method of drawing a three-dimensional picture, comprising mixing plate-like hematite particles having an average particle diameter of 0.5 to 5.0 μm, a lamellar thickness of 50Å to 500Å and a plate ratio of 50:1 to 500:1 with rubber or resin composition base materials, kneading and molding the resultant mixture, applying a magnetic field in a fluid state, and then curing said molded material to form a rubber or resin shaped product, whereby a picture formed by controlling the strength and the direction of the magnetic flux is drawn.

18. A drawing method according to claim 17, wherein 0.1 to 90 parts by weight of said plate-like hematite particles are mixed with 100 parts by weight of said rubber or resin composition base materials.

19. A drawing method according to claim 17, wherein a magnetic field having a magnetic flux density of 100 to 50,000 gauss is applied.

* * * * *

UNITED STATES PATENT AND TRADEMARK OFFICE
CERTIFICATE OF CORRECTION

PATENT NO. : 5,133,805
DATED : July 28, 1992
INVENTOR(S) : KURATA et al It is certified that error appears in the above-identified patent and that said Letters Patent is hereby corrected as shown below:

Title page, Column 1, Item [75] Inventors: correct the spelling of the third inventor to read --Nanao Horiishi--.

Signed and Sealed this

Seventeenth Day of August, 1993

Attest:

BRUCE LEHMAN

Attesting Officer

Commissioner of Patents and Trademarks